Aug. 23, 1938.  V. E. CARBONARA  2,127,807
INDICATING INSTRUMENT
Filed Nov. 14, 1933   2 Sheets-Sheet 1

INVENTOR.
VICTOR E. CARBONARA.
BY Stephen Cerstvik
ATTORNEY.

Aug. 23, 1938.   V. E. CARBONARA   2,127,807
INDICATING INSTRUMENT
Filed Nov. 14, 1933   2 Sheets-Sheet 2

INVENTOR.
VICTOR E. CARBONARA.
BY Stephen Cerstvik
ATTORNEY.

Patented Aug. 23, 1938

2,127,807

UNITED STATES PATENT OFFICE 2,127,807

INDICATING INSTRUMENT

Victor E. Carbonara, Rockville Centre, N. Y., assignor to Bendix Aviation Corporation, South Bend, Ind., a corporation of Delaware Application November 14, 1933, Serial No. 697,997

5 Claims. (Cl. 116—129)

The present invention relates to indicating instruments and, more particularly, to novel indicating means therefor.

The invention is particularly adapted to indicating instruments of the type having an indicating dial mounted in a casing for angular movement or rotation about a vertical axis and having a top portion and a downwardly extending peripheral flange on which are marked the scale graduations of the dial, the latter being visible through a cover glass provided on one side of the casing. Such an instrument may be a compass, for example, in which the dial constitutes the compass card or it may be an automobile speedometer in which the dial is graduated to indicate speed in miles per hour. The instrument may be constructed and arranged for mounting on an instrument panel with the cover glass of the instrument positioned substantially in the plane of the panel or, if a concavo-convex cover glass of the lens type is employed, with the cover glass projecting slightly from the plane of the panel.

Heretofore, in instruments of the above type there was provided an index, or lubber's mark in the case of a compass which index was usually in the form of a hair line, wire or strip extending vertically in front of the dial so that the scale graduation which coincided with the hair line provided the required indication or reading of the instrument. In the case of the compass, this hair line or lubber's mark was usually in the form of an upwardly projecting curved wire carried by the pivot post on which the card of the compass was pivotally mounted. Such an index or lubber's mark served its purpose satisfactorily when the instrument was viewed in the day time. When, however, illuminating means were provided for viewing the instrument at night and the source was located above the index or lubber's mark, which is the desired location in order to provide sufficient illumination of the dial without undue glare, such a form of index or lubber's line obviously could not be illuminated in its entirety because the portion sloping inwardly toward the card and away from the direction of the incoming light remained in the dark and only the upper part of the curved index, i. e., the part nearer the source of illumination above the index was illuminated.

Accordingly, one of the objects of the present invention is to provide, in an indicating instrument of the class described, a novel index whereby, when a source of illumination is provided which is located above the front part of the dial and over the index, said index will be illuminated in its entirety.

Another object of the invention is to provide, in an indicating instrument of the above type, a novel index cooperating with the dial of the instrument, which is so formed as to avoid parallax and to provide complete illumination of said index when the illuminating source is located thereabove.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views.

Figure 1:
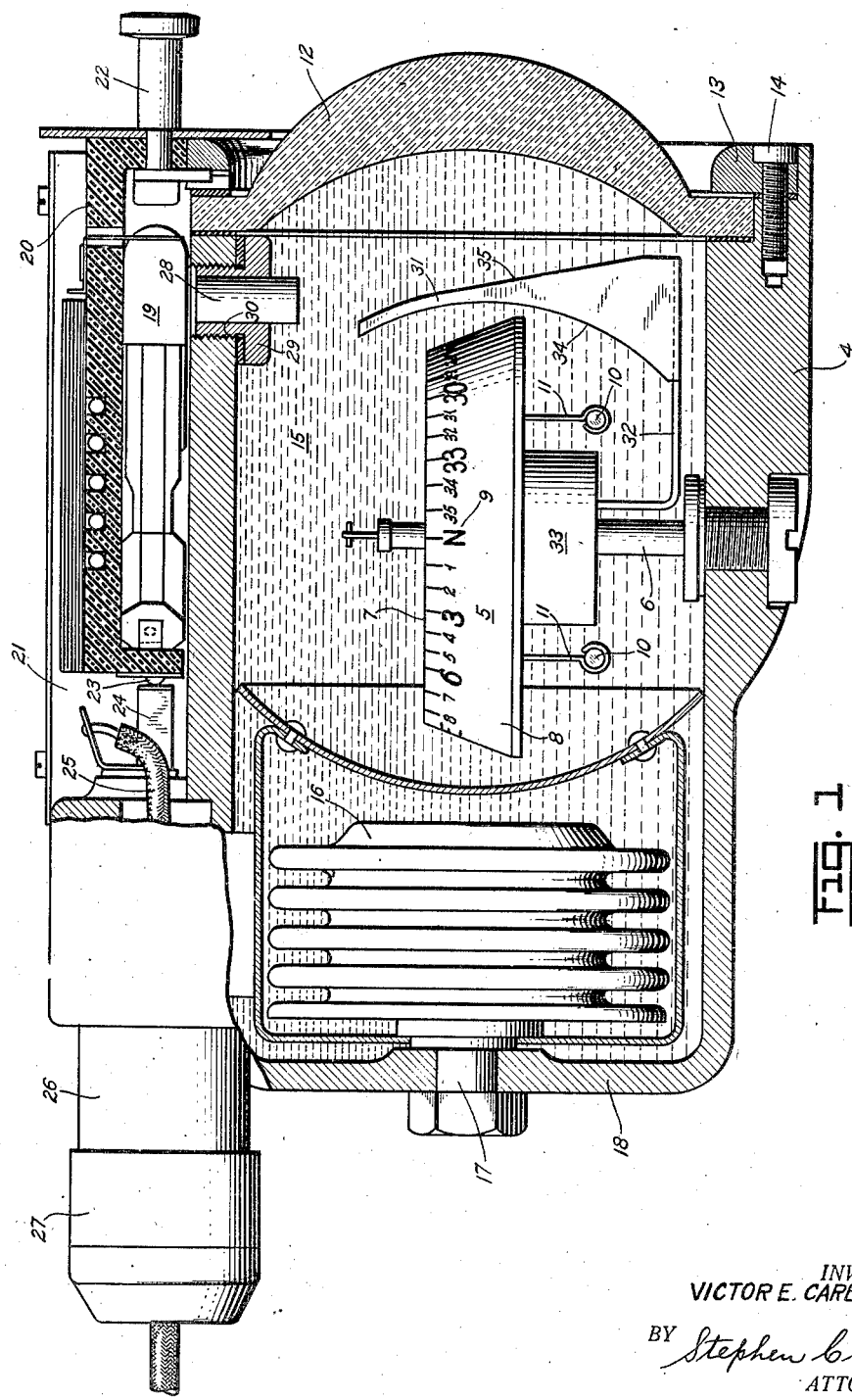
Fig. 1 is a vertical section of one form of instrument embodying the novel index of the present invention.
Figure 2:
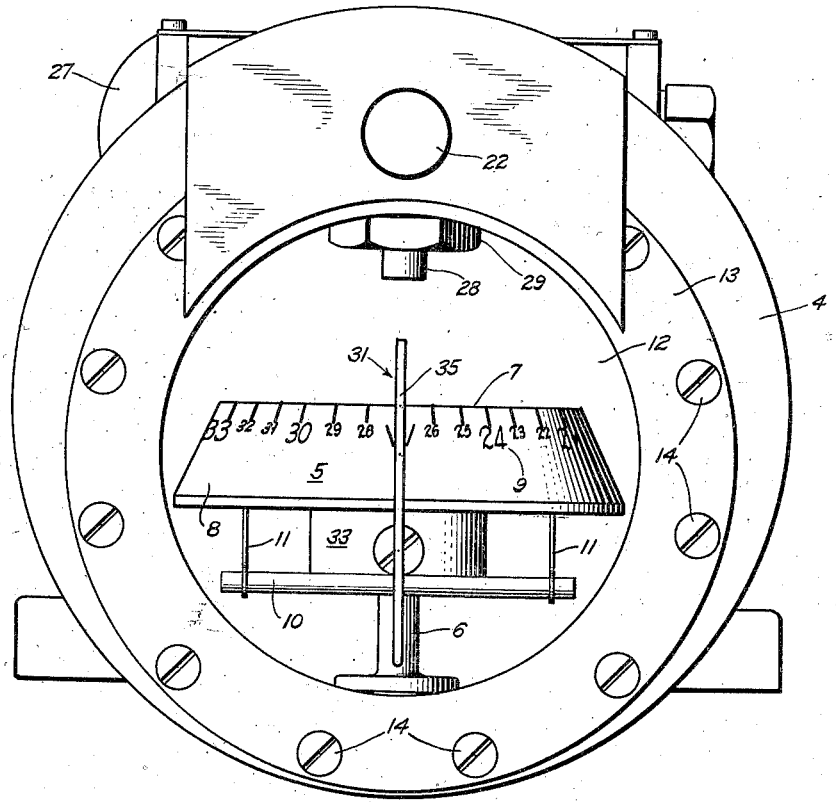
Fig. 2 is a front view of the instrument shown in Fig. 1.
Figure 3:
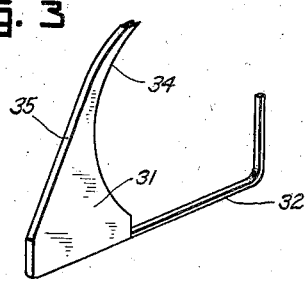
Fig. 3 is a perspective view of the novel index embodying the invention.

Referring to the drawings and, more particularly, to Fig. 1, the instrument shown embodying the present invention is in the form of a magnetic compass of the liquid type wherein means are provided for illuminating the compass card of the compass from above as is the present general practice in the compass art. As illustrated, the compass comprises a casing 4 within which is contained a compass card 5 pivotally mounted on a pivot post 6 in any suitable manner known in the art. The card is substantially flat at the top as shown at 7 and is provided with a downwardly extending annular flange or rim 8 on which are marked the compass graduations 9. The card is provided with a pair of bar magnets 10 suspended from the card by means of members 11 in order to impart magnetic North-seeking properties to said card. A suitable cover glass 12, preferably of the lens type, is provided at one end of the casing 4 and is secured thereto in any suitable manner, as by means of a clamping ring 13 and screws 14 (Fig. 2). In order to dampen the compass card 5, the compass bowl is filled with a suitable damping liquid 15. An expansible diaphragm device 16 is also provided at the rear of the compass bowl for compensating for the expansion and contraction of the liquid 15 due to temperature changes, the interior of said diaphragm device being in communication with the exterior of the bowl through an opening (not shown) provided in the bolt 17 by means of which said device is secured to the rear wall 18 of the compass bowl 4.

Means are provided for illuminating the front portion of the compass card, i. e., the portion which is visible from the front of the compass through the cover glass 12 and, in the form shown, comprise a lamp 19 positioned horizontally in an auxiliary compartment 21 formed by a removable drawer 20 which is adapted to be inserted into the auxiliary compartment by means of a knob 22. The drawer 20 is so arranged that upon the insertion thereof into the compartment 21 the lamp 19 is adapted to be connected to an electrical circuit by means of a contact 23 carried by the drawer and a contact 24 carried by the compass bowl 4 in the compartment 21. Connected to the contact 24 is a conductor 25 which leads to a receptacle 26 into which a plug 27 is adapted to be inserted. Light from the lamp 19 is introduced into the interior of the compass bowl 4 by means of a glass rod 28 carried by a threaded member 29 which is screwed into an opening 30 provided in the compass bowl 4 directly above the front portion of the compass card 5. Thus, when the lamp 19 is energized, light passes through the glass member 28 and onto the front portion of the compass card.

The structure described thus far constitutes a compass of the type disclosed and claimed in a co-pending application of Raymond K. Stout, Serial No. 650,520, filed January 6, 1933, and forms no part of the present invention except insofar as it is required that the illuminating means be above the compass card, such location being desirable for the purpose of the present invention. Cooperating with the compass card 5 is an index or lubber's mark 31 carried by an arm 32 secured to the member 33 carried by the pivot post 6. In accordance with the present invention, this index or lubber's mark 31 is so formed and arranged that when light is introduced into the compass bowl through the glass 28 from the lamp 19, said index member is illuminated in its entirety in order that it may be completely visible at night thereby enabling reading of the compass card more readily. As illustrated, said index or lubber's mark 31 is constituted by a flat strip projecting upwardly from the member 32 and in a vertical plane extending radially from the periphery of the compass card so that the inner edge 34 is adjacent the card and the outer edge 35 is visible from the front of the compass through the cover glass 12. The inner edge 34 is curved concavely with the concavity toward the card so that the bottom of the flange 8 falls substantially half way between the upper end and the lower end of the flat strip. The outer edge 35 is made to slope substantially continuously in an outward direction, i. e., toward the cover glass 12, the slope being such that the upper end of the strip is relatively narrow and falls in alignment with the inner side of the glass member 28, while the lower end of the strip is relatively wide and bottom of the outer edge is relatively close to the cover glass 12. Heretofore, this outer edge 35 was curved in the same direction as the inner edge 34 inasmuch as the index was provided by a curved wire. In view of the fact that, in accordance with the present invention, the outer edge 35 is made to slope substantially continuously in the same direction, all parts thereof will receive light from the source 19 through the glass member 28, thereby facilitating the reading of the indication on the compass card 5. Also, because said index member is constituted by a flat strip having sides of substantial surface, said sides are also illuminated, thereby enabling the viewing of the inner edge 34 more readily against the compass card and avoiding parallax which is always present when a hair line or wire is used. In other words, by virtue of the flat nature of the member 31 the card may be viewed from either side of said index without giving an incorrect reading. If the index or lubber's mark were in the form of a hair line or wire, then if the compass is viewed from the side the index will appear to be in alinement with a graduation farther from the index in a direction away from the observer. For example, if the index 31, shown in Fig. 2, were a hair line instead of the flat strip, then if the card were observed from the left of Fig. 2 the index might appear to be in alignment with the graduation 25 or 26 on the compass card instead of with the graduation W. On the other hand, if the card were viewed from the right of Fig. 2, the index would appear to be in alignment with graduations 28 or 29. With applicant's novel index, such inaccuracy is not possible because the substantial width of the strip indicates to the observer that his line of vision is not in the plane of the index. He must, therefore, shift his line of vision until it is in the plane of the strip at which time only the outer edge 35 will be visible.

There is thus provided an indicating instrument embodying a novel index member for cooperation with the dial of the instrument whereby, when the instrument is illuminated, said index member is illuminated in its entirety thereby greatly facilitating the reading of the instrument and whereby, due to the novel form of said index member, parallax is avoided.

Although only one embodiment of the invention has been illustrated and described with reference to a magnetic compass of the liquid type, it will be apparent to those skilled in the art that the invention may be adapted to instruments of other types such, for example, as an automobile speedometer having a dial mounted for angular movement or rotation about a vertical axis, i. e., the broad principles of the invention may be adapted to any instrument having a dial angularly movable or rotatable about a vertical axis and visible from the front of the instrument. Various changes in the form and relative arrangement of the parts may also be made without departing from the scope of the invention. Reference is, therefore, to be had to the appended claims for a definition of the limits of the invention.

What is claimed is:

1. In an indicating instrument, an indicating dial mounted for angular movement about a vertical axis and having an annular rim with indicating marks thereon, and an index cooperating with said rim and comprising a substantially flat member positioned adjacent said rim in a vertical plane passing through said axis, the outer edge of said member sloping substantially continuously outwardly of the dial from one end to the other of said member.

2. In an indicating instrument, an indicating dial, means for illuminating said dial from the top thereof, and an index member cooperating with said dial and comprising a flat vertical member positioned edgewise with respect to said dial and having its outer edge sloping substantially continuously outwardly from the top to the bottom, said member being so positioned that said edge may be illuminated in its entirety.

3. In an indicating instrument, an indicating dial, means adjacent said dial for illuminating the same, and an index member cooperating with said dial and comprising a substantially flat member positioned edgewise with respect to said dial and having one end near the illuminating means and having its outer edge sloping substantially continuously outward of the dial from that end of said member which is near the illuminating means whereby said outer edge is illuminated in its entirety.

4. In a magnetic compass of the liquid type, a compass card having a downwardly extending annular flange with scale graduations thereon, and a lubber's mark comprising a flat member positioned vertically in a plane extending radially from the periphery of the card and having a concavely curved inner edge adjacent to the periphery of said card with the upper end of said curved edge extending slightly over said card and the lower end of said curved edge extending under said card, the outer edge of said flat member sloping outwardly from the top to the bottom thereof.

5. In a magnetic compass of the liquid type including a casing having a front opening closed by a cover glass, a compass card in said casing and having a downwardly extending annular flange with scale graduations thereon visible through said cover glass, means above the front edge of said card for illuminating the visible front portion thereof, and a lubber's mark comprising a flat member positioned vertically in a plane extending radially from said front edge of said card and having a concavely curved inner edge adjacent the edge of said card with the card substantially midway between the ends of said curved edge and the upper end of the curved edge being substantially under said illuminating means and the lower end of said curved edge extending under said card, the outer edge of said flat member sloping outwardly from the top to the bottom thereof whereby said outer edge is illuminated in its entirety.

VICTOR E. CARBONARA.